United States Patent [19]

Sawamoto et al.

[11] Patent Number: 4,933,446
[45] Date of Patent: Jun. 12, 1990

[54] TRIPHENODIOXAZINE COMPOUNDS

[75] Inventors: Hirokazu Sawamoto, Minoo; Naoki Harada, Suita; Takashi Omura, Ashiya, all of Japan

[73] Assignee: Sumitomo Chemical Company, Limited, Osaka, Japan

[21] Appl. No.: 133,605

[22] Filed: Dec. 16, 1987

[30] Foreign Application Priority Data

Jan. 7, 1987 [JP] Japan .................................. 62-1372

[51] Int. Cl.$^5$ .................... C09B 19/02; C07D 265/38
[52] U.S. Cl. .......................................... 544/76; 544/75
[58] Field of Search .................................... 544/75, 76

[56]  References Cited
U.S. PATENT DOCUMENTS

| 3,223,470 | 12/1965 | Boedeker et al. | 8/29 |
| 4,532,323 | 7/1985 | Jäger | 544/75 |
| 4,841,048 | 6/1989 | Sawamoto et al. | 544/74 |
| 4,841,049 | 6/1989 | Seitz | 544/76 |

FOREIGN PATENT DOCUMENTS

| 0084718 | 8/1983 | European Pat. Off. . |
| 0158857 | 10/1985 | European Pat. Off. . |
| 60-18359 | 5/1985 | Japan . |
| 62-48768 | 3/1987 | Japan . |
| 1368158 | 9/1974 | United Kingdom . |

OTHER PUBLICATIONS

Chemical Abstracts, vol. 97, No. 2, Jul. 1982, p. 83, Abstract No. 7816g (JP-A-82 14 654).

Primary Examiner—Richard L. Raymond
Attorney, Agent, or Firm—Stevens, Davis, Miller & Mosher

[57]  ABSTRACT

A dioxazine compound represented by the following formula in a free acid form,

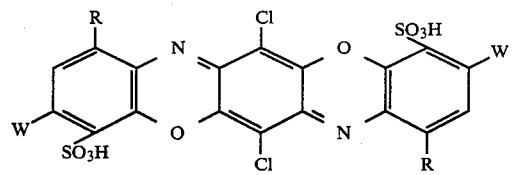

wherein R is halogeno, alkyl, alkoxy or sulfo, and W is

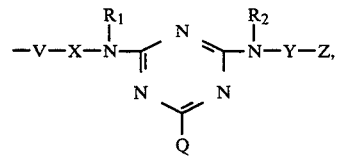

wherein V is a direct linkage or

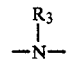

in which $R_3$ is hydrogen or alkyl, X is a direct linkage or an aliphatic, alicyclic, araliphatic or aromatic bridging group, Y is unsubstituted or substituted phenylene or naphthylene, Z is —SO$_2$CH=CH$_2$, —SO$_2$CH$_2$CH$_2$OSO$_3$H or the like, Q is sulfo, hydroxy, halogeno, alkoxy, phenoxy or amino, and $R_1$ and $R_2$ independently of one another are each hydrogen or alkyl, which is useful for dyeing or printing fiber materials with advantages to give dyed or printed materials superior in fastness properties such as chlorine fastness.

8 Claims, No Drawings

TRIPHENODIOXAZINE COMPOUNDS

The present invention relates to a triphenodioxazine compound, a process for producing the same and a process for dyeing or printing fiber materials using the same.

More specifically, the present invention relates to a triphenodioxazine compound having a so-called vinylsulfone type fiber reactive group through a triazinyl group, which is useful for dyeing or printing fiber materials such as cellulose fibers, natural or synthetic polyamide fibers, polyurethane fibers, leathers and mixed fibers thereof to give dyes or printed products superior in light fastness, wet fastness, chlorine fastness and the like.

Triphenodioxazine reactive dyes useful for dyeing or printing hydroxyl or amide group-containing fiber materials are known as disclosed in, for example, U.S. Pat. No. 3,223,470, British Pat. No. 1,368,158 and Published Examined Japanese patent application No. 60-18359.

However, these known reactive dyes of this kind insufficiently meet needs for the dyeing performance such as level-dyeing property as well as build-up property, dyeing rate and fastness properties particularly such as chlorine fastness.

The present inventors have undertaken extensive studies to find a triphenodioxazine compound sufficiently meeting such needs, particularly a compound capable of giving dyes or printed products of hydroxyl group-containing fiber materials superior in fastness properties, particularly chlorine fastness, with superior dye performance, and as a result have found a specific triphenodioxazine compound meeting such needs.

The present invention provides a triphenodioxazine compound represented by the following formula (I) in the free acid form,

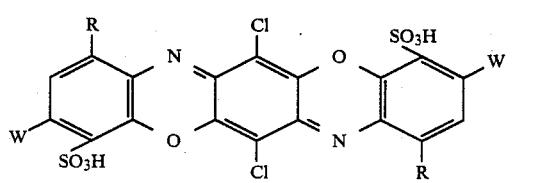   (I)

where R is halogeno, alkyl, alkoxy or sulfo, and W is

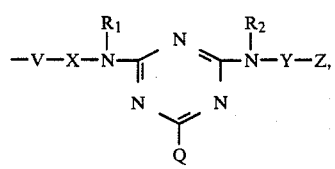

wherein V is direct linkage or

in which $R_3$ is hydrogen or unsubstituted or substituted alkyl, X is a direct linkage or a straight or branched aliphatic, alicyclic, araliphatic or aromatic bridging group unsubstituted or substituted, Y is unsubstituted or substituted phenylene or naphthaylene, Z is $-SO_2CH=CH_2$ or $-SO_2CH_2CH_2Z_1$ in which $Z_1$ is a group splittable by the action of an alkali, Q is sulfo, hydroxy, halogeno, alkoxy, or unsubstituted or substituted phenoxy or amino, and $R_1$ and $R_2$ independently of one another are each hydrogen or alkyl, and a process for producing the triphenodioxyazine compound of the formula (I), which comprises subjecting any one of an intermediate dioxazine compound represented by the following formula (II) in the free acid form,

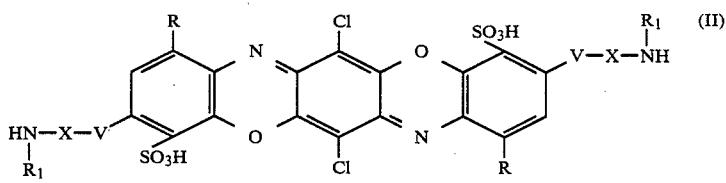   (II)

wherein R, $R_1$, V and X are as defined above, and an amine compound represented by the following formula (III),

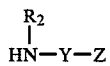   (III)

wherein $R_2$, Y and Z are as defined above, and a compound, if any, represented by the following formula (IV),

   (IV)

wherein $Q_1$ is sulfo, hydroxy, alkoxy, or unsubstituted or substituted phenoxy or amino, to first condensation with a 2,4,6-trihalogeno-s-triazine, followed by second and third condensation, if any, with the remaining.

The present invention also provides a process for dyeing or printing hydroxyl or amide group-containing materials, which comprises using the triphenodioxazine compound of the formula (I).

In the above formula (I), the alkyl and alkoxy represented by R are those having 1 to 4 carbon atoms. With respect to the symbol R, preferred are chloro, methyl, methoxy, ethoxy and sulfo.

The alkyl represented by $R_1$, $R_2$ and $R_3$ is the one having 1 to 4 carbon atoms unsubstituted or substituted by hydroxy, cyano, $C_{1-4}$ alkoxy, halogeno, carbamoyl, carboxy, $C_{1-4}$ alkoxycarbonyl, $C_{1-4}$ alkylcarbonyloxy, sulfo or sulfamoyl. Preferred examples of $R_1$, $R_2$ and $R_3$ are those as disclosed in Published Unexamined Japanese patent application No. 59-122549. Of these, preferred are hydrogen, methyl and ethyl.

With respect to the symbol X, the aliphatic bridging group can contain a hereto atom, and can be additionally substituted by sulfo, carboxy, methyl, methoxy or optionally substituted phenyl. Examples thereof are as follows.

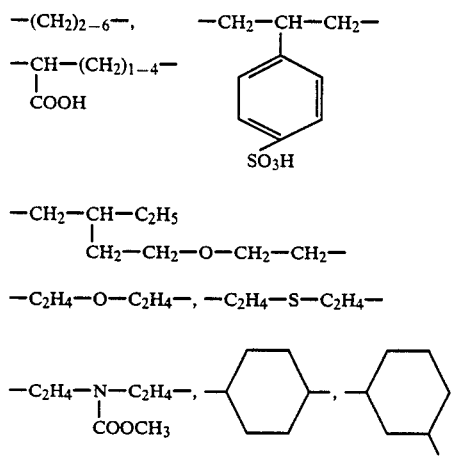

The araliphatic bridging group can contain a hetero atom, and can be additionally substituted by sulfo, carboxy, methyl, methoxy or optionally substituted phenyl. Examples thereof are as follows.

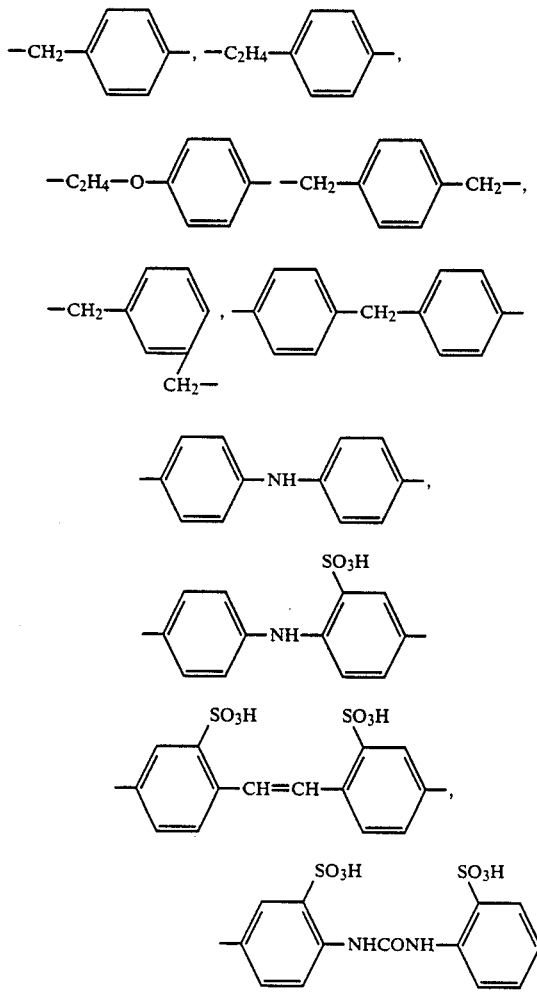

The aromatic bridging group can be additionally substituted by sulfo, carboxy, methyl, methoxy or optionally substituted phenyl. Examples thereof are as follows.

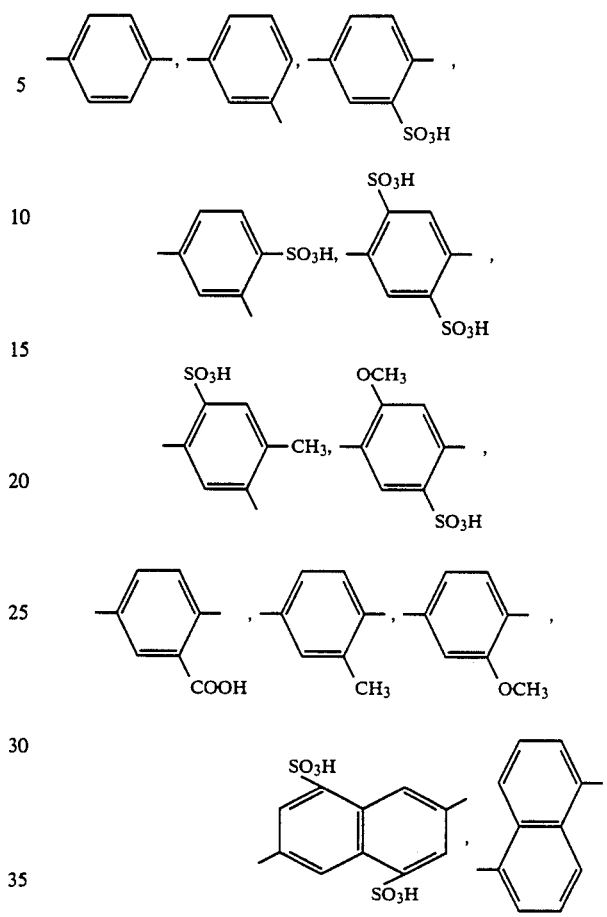

Of these bridging groups represented by the symbol X, preferred are $C_{2-6}$ alkylene, particularly such as ethylene and propylene, and phenylene unsubstituted or substituted by sulfo.

With respect to the symbol Q, the halogeno includes chloro and fluoro, and the alkoxy is preferably the one having 1 to 4 carbon atoms. The phenoxy is unsubstituted or substituted once or twice by chloro, bromo, methyl, ethyl, methoxy, ethoxy, sulfo or carboxy. The amino includes, for example, unsubstituted amino, alkylamino, cycloalkylamino, aralkylamino, arylamino and N,N-disubstituted amino such as N,N-dialkylamino, N-alkyl-N-cycloalkylamino and N-alkyl-N-arylamino, as well as heterocyclic ring-containing amino which heterocyclic ring may be further addition-condensed with a homocyclic ring, and N-heterocyclic ring-constituting amino which may contain additional hetero atoms (in the present invention, the term "N-heterocyclic ring-constituting amino" is intended to mean such that the nitrogen atom of the amino is a member forming a heterocyclic ring).

In the above definition with respect to the amino, the alkyl is a straight or branched one preferably having 1 to 4 carbon atoms, and preferable examples of the cycloalkyl, aralkyl and aryl are cyclohexyl, benzyl, phenethyl, phenyl and naphthyl, respectively. Examples of the heterocyclic ring are furan, thiophene, pyrazole, pyridine, pirimidine, quinoline, benzimidazol, benzthiazol and benzoxazol. The N-heterocyclic ring-constituting amino is preferably a six-membered ring which may contain an additional hetero atom such as nitrogen, oxygen and sulphur. The above-mentioned alkyl, cycloalkyl, aralkyl, aryl, heterocyclic ring and N-heterocyclic ring may be unsubstituted or substituted by halogen, nitro, cyano, trifluoromethyl, sulfamoyl, carbamoyl, $C_1$–$C_4$ alkyl, $C_1$–$C_4$ alkoxy, acylamino such as acetyl-, propionyl-, crotyl- or benzoyl-amino, ureido, hydroxyl, carboxyl, sulfomethyl and/or sulfo.

Preferable examples of the amino represented by Q are —$NH_2$, mehtylamino, ethylamino, propylamino, butylamino, hexylamino, β-methoxyethylamino, β-ethoxyethylamino, γ-methoxypropylamino, N,N-dimethylamino, N,N-diethylamino, β-chloroethylamino, β-cyanoethylamino, N,N-di-β-hydroxyethylamino, β-hydroxyethylamino, γ-hydroxypropylamino, benzylamino, phenethylamino, cyclohexylamino, N-methyl-N-phenylamino, N-ethyl-N-phenylamino, N-propyl-N-phenylamino, N-butyl-N-phenylamino, N-β-cyanoethyl-N-phenylamino, N-ethyl-2-methylphenylamino, N-ethyl-4-methylphenylamino, N-ethyl-3-sulfophenylamino, N-ethyl-4-sulfophenylamino, phenylamino, toluidino, xylidino, chloroanilino, anisidino, phenetidino, 2-, 3- and 4-sulfoanilino, 2,5-disulfoanilino, sulfomethylanilino, N-sulfomethylanilino, 3- and 4-carboxyphenylamino, 2-carboxy-5-sulfophenylamino, 2-carboxyl-4-sulfophenylamino, 2-methoxy-5-sulfophenylamino, 2-methyl-5-sulfophenylamino, 4-sulfonaphthyl-(1)-amino, 3,6-disulfonaphthyl-(1)-amino, 3,6,8-trisulfonaphthyl-(1)-amino, 4,6,8-trisulfonaphthyl-(1)-amino, 6-sulfonaphthyl-(2)-amino, 4,8-disulfonaphthyl-(2)-amino, 3,6,8-trisulfonaphthyl-(2)-amino, 4,6,8-trisulfonaphthyl-(2)-amino, pyridyl-(2)-amino, morpholino, piperidino, piperazino, ethanolamino, methanolamino, N,N-diethanolamino, N,N-dimethanolamino, N-ethanol-N-methylamino and N-ethyl-N-methanolamino.

Of these represented by the symbol Q, particularly preferred are halogeno such as chloro and the like.

The phenylene represented by Y is unsubstituted or substituted once or twice by methyl, ethyl, methoxy, ethoxy, chloro, bromo or sulfo, and the naphthylene is unsubstituted or substituted once by sulfo. Examples thereof are as follows:

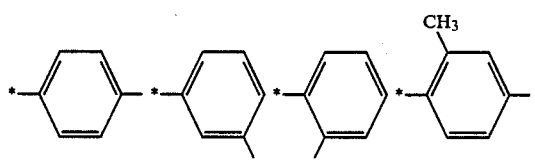

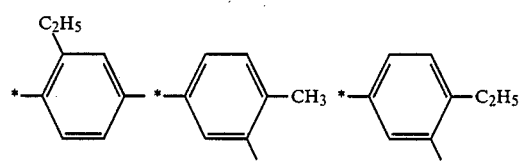

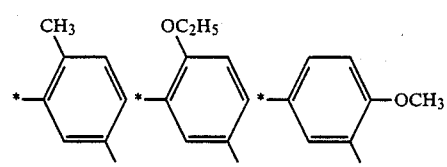

-continued

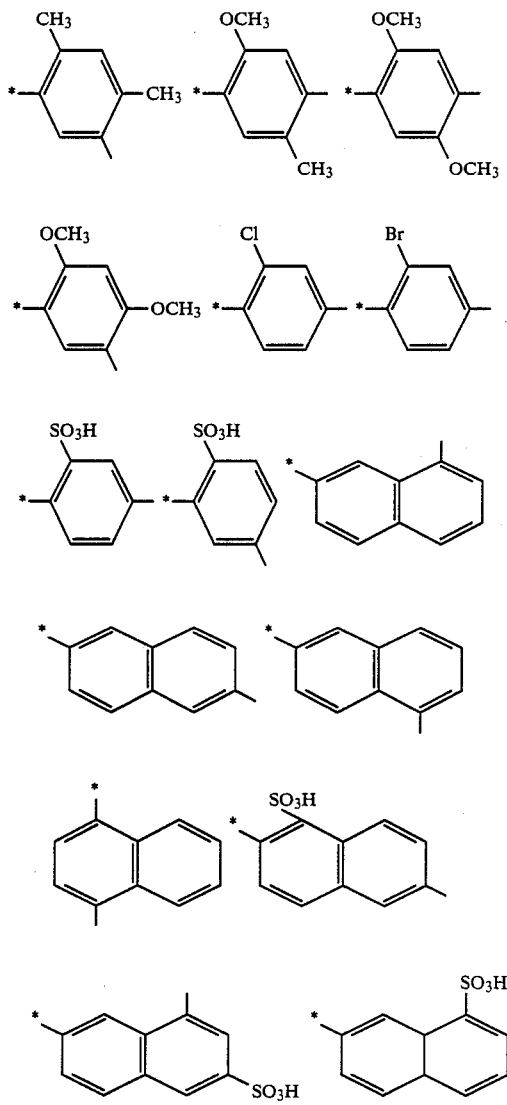

In the above formulas, the asterisked linkage bonds to

Of these, preferred are phenylene unsubstituted or substituted by methyl, methoxy or sulfo.

The group splittable by the action of an alkali, which is represented by $Z_1$, includes sulfato, thiosulfato, phosphato, acetoxy and halogeno. In the present invention, particularly preferred Z is β-sulfatoethylsulfonyl, which may be partially replaced by vinylsulfonyl.

Among the triphenodioxazine compounds represented by the formula (I), particularly preferred is a compound represented by the following formula (I-1) in the free acid form,

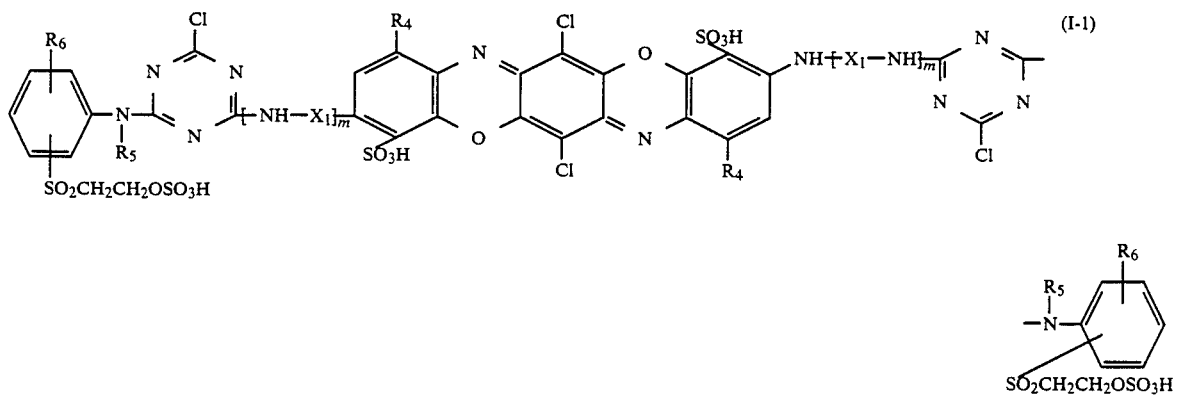

wherein $R_4$ is chloro, methyl, methoxy, ethoxy or sulfo, $X_1$ is ethylene, propylene or sulfophenylene, $R_5$ is hydrogen, methyl or ethyl, $R_6$ is hydrogen, methyl, methoxy or sulfo, and m is 0 or 1.

The triphenodioxazine compound of the formula (I) may be in the form of a free acid or a salt, particularly an alkali metal or alkaline earth metal salt such as sodium, potassium and lithium salts.

The triphenodioxazine compound of the formula (I) can be produced in the following manner.

The intermediate dioxazine compound of the formula (II) and the amine compound of the formula (III) together with or without the compound of the formula (IV) can be subjected to condensation reactions in order with a 1,3,5-trihalogeno-s-triazine, thereby obtaining the desired dioxazine compound of the formula (I).

Although the condensation reactions can be carried out under optional reaction conditions and the order of the condensation reactions is not limited, the first condensation can be preferably carried out at a temperature of $-10°$ to $40°$ C. and at a pH ranging from 2 to 9, and the second condensation at temperature of $0°$ to $70°$ C. and at a pH ranging from 2 to 9. When the compound of the formula (IV) is used in compliance with request, the third condensation can be preferably carried out at a temperature of $10°$ to $100°$ C. and at a pH ranging from 2 to 7. The order of the condensation reactions can be determined preferably in such a manner that any compound having the lowest reactivity to the 1,3,5-trihalogeno-s-triazine is subjected to first condensation reaction.

The intermediate dioxazine compound of the formula (II) can be readily prepared in a conventional manner, for example, in the following manner.

An aniline compound represented by the following formula (V) in the free acid form,

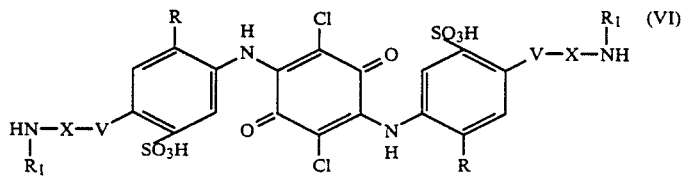

wherein R, $R_1$, V and X are as defined above, is subjected to condensation with chloranil, thereby obtaining a dianilide compound represented by the following formula (VI) in the free acid form, $$\text{(VI)}$$

wherein R, $R_1$, V and X are as defined above. The dianilide compound isolated, preferably followed by drying, is then subjected to ring-closure, if desired, in the presence of an oxidizing agent, thereby obtaining the desired intermediate dioxazine compound (II).

After completion of the reaction, the desired triphenodioxazine compound-containing reaction mixture may be formed into a liquid commercial product, if desired, after removing inorganic salts and with addition of a stabilizer or a dyeing improver. The liquid product obtained or the aforesaid reaction mixture may be subjected to evaporation such as spray-drying, thereby obtaining a pulverulent commercial product. Alternatively according to a conventional manner, the reaction mixture may be formed into either a liquid or pulverulent commercial product through salting-out using an electrolyte.

The triphenodioxazine compound (I) of the present invention is fiber-reactive and useful for dyeing or printing hydroxyl group-containing and amide group-containing materials, preferably in a fibrous form or a mixed fibrous form.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fiber such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the triphenodioxazine compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like, together with a hydrotropic agent, a penetrant or a level dyeing agent. The neutral salt usable for prompting the exhaustion may be added to a dye bath before or after temperature reaching a desired level for the dyeing, if desired, dividedly.

The padding can be carried out by padding the fiber materials at ambient temperature of an elevated temperature, and after drying, steaming or dry-heating the materials to perform the dye-fixation.

The printing can be carried out in a one-phase or two-phase manner. The one-phase printing may be conducted by printing the fiber materials with a printing paste containing an acid binding agent such as sodium hydrogencarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali or alkaline earth metals and inorganic or hydroxides and alkai metal salts of inorganic or organic acids having a weak or medium strength. Particularly preferred are sodium salts and potassium salts. Examples thereof are sodium hydroxide, potassium hydroxide, sodium hydrogencarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventionl level dyeing agent such as condensation product between cyanuric chloride and 3 times by mole of aminobenzene-sulfonic acid or aminonaphthalenesulfonic acid, or an addition product between stearylamine and ethylene oxide, and the like.

The present triphenodioxazine compound can be characterized by excellent dye performance in the dyeing and printing of fiber materials, particularly cellulose fiber materials. For example, the triphenodioxazine compound can give dyed or printed products superior in fastness properties such as light fastness, perspiration-light fastness, wet fastness including washing resistance, peroxide-washing resistance, perspiration resistance, acid-hydrolysis resistance and alkali resistance, chlorine fastness, abrasion fastness and iron-fastness, with superior build-up, level-dyeing and washing-off properties. Moreover, the present triphenodioxazine compound is superior in solubility and exhaustion and fixation abilities, and robust so that a shade to be obtained can hardly be affected by changes in dyebath conditions such as dyeing temperatures, pH, amounts of inorganic salts and bath ratios, and therefore dyed or printed products with a constant quality can be obtained with superior reproducibility.

The present invention is illustrated in more detail with reference to the following Examples, which are only illustrative, but not limitative. In Examples, all parts and % are by weight.

EXAMPLE 1

A solution of 1,4-diamino-2-methoxybenzene-5-sulfonic acid (109 parts) in water (700 parts) was added dropwise to a dispersion of chloranil (64.6 parts) in ethanol (4000 parts), and the mixture was heated upto 60° C. and kept at this temperature to complete the reaction. Thereafter, the reaction mixture was cooled to deposit crystals. The crystals isolated were mixed with 28% oleum (800 parts), and the mixture was heated up to 45° C. and kept at this temperature to complete the reaction. The reaction mixture was then poured into ice water, followed by salt-out to deposit crystals, which were separated to obtain an intermediate dioxazine compound of the following formula in the free acid.

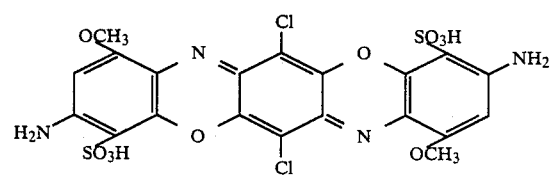

The intermediate dioxazine compound (60.5 parts) and cyanuric chloride (19 parts) were allowed to react with each other in water (500 parts), while hydrochloric acid generated being neutralized using sodium carbonate. Into the reaction mixture was added 1-aminobenzene-3-β-sulfatoethylsulfone (28 parts), and the mixture was allowed to react with each other. Thereafter, salting-out and isolation of the crystals gave a triphenodioxazine compound of the following formula in the free acid form.

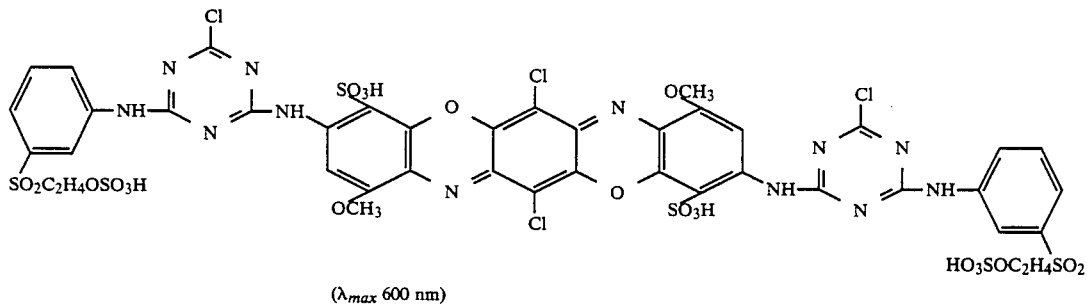

(λ$_{max}$ 600 nm)

EXAMPLE 2

The triphenodioxazine compound obtained in Example 1 (each 0.1, 0.3 and 0.6 part) was dissolved in water (200 parts) respectively, and sodium sulfate (10 parts) and cotton (10 parts) were added thereto. The bath was heated to 60° C., and then sodium carbonate (4 parts) was added thereto. Respective dyeings were continued at that temperature for 1 hour. Thereafter, the cotton taken out was washed with water and soaped, followed by washing with water, to obtain each dyed product of a reddish blue color superior in fastness properties, particularly chlorine fastness, light fastness and perspiration-light fastness with superior build-up property.

EXAMPLES 3 TO 26

Example 1 was repeated, provided that 1,4-diamino-2-methoxybenzene-5-sulfonic acid used in Example 1 was replaced by the aniline compound of the formula (V) as shown in the following table to obtain the intermediate dioxazine compound (II) also as shown below, which was subjected to condensation with the amine compound (III) also as shown in the following table in place of 1-aminobenzene-3-β-sulfatoethylsulfone, whereby the corresponding triphenodioxazine compound was obtained.

| Example No. | Aniline compound (V) | Intermediate dioxazine (II) | Amine (III) | Shade |
|---|---|---|---|---|
| 3 | 2-amino-4-methoxy-5-aminobenzenesulfonic acid (OCH₃, NH₂, SO₃H, H₂N substituents) | dioxazine with SO₃H, NH₂, OCH₃, Cl, Cl, OCH₃, SO₃H, NH₂ substituents | 4-amino-phenyl-SO₂C₂H₄OSO₃H | Reddish blue |
| 4 | " | " | 2-methoxy-5-amino-phenyl-SO₂C₂H₄OSO₃H | Reddish blue |
| 5 | " | " | 6-amino-naphthyl-SO₂C₂H₄OSO₃H | Reddish blue |
| 6 | 2-amino-4-methoxy-5-aminobenzenesulfonic acid | dioxazine (same as above) | 4-methoxy-3-amino-phenyl-SO₂C₂H₄OSO₃H | Reddish blue |
| 7 | " | " | 4-sulfo-3-amino-phenyl-SO₂C₂H₄OSO₃H | Reddish blue |

-continued

| Example No. | Aniline compound (V) | Intermediate dioxazine (II) | Amine (III) | Shade |
|---|---|---|---|---|
| 8 | " | | naphthalene with SO₃H, H₂N, SO₂C₂H₄OSO₃H | Reddish blue |
| 9 | " | | C₂H₅(HN)-C₆H₄-SO₂C₂H₄OSO₃H | Reddish blue |
| 10 | OC₂H₅, NH₂, SO₃H, H₂N substituted benzene | dioxazine with SO₃H, OC₂H₅, NH₂ and Cl substituents | C₂H₅(HN)-C₆H₄-SO₂C₂H₄OSO₃H | Reddish blue |
| 11 | " | | naphthalene with SO₃H, H₂N, SO₂C₂H₄OSO₃H | Reddish blue |
| 12 | CH₃, NH₂, SO₃H, H₂N substituted benzene | dioxazine with SO₃H, CH₃, NH₂ and Cl substituents | H₂N-C₆H₄-SO₂CH=CH₂ | Reddish blue |
| 13 | " | | H₂N-C₆H₄-SO₂CH₂CH₂OSO₃H | Reddish blue |

-continued

| Example No. | Aniline compound (V) | Intermediate dioxazine (II) | Amine (III) | Shade |
|---|---|---|---|---|
| 14 | 2-amino-4-methyl-5-aminobenzenesulfonic acid (CH₃, NH₂, H₂N, SO₃H) | dioxazine with CH₃/SO₃H/NH₂ substituents | 2-amino-6-($HO_3SOC_2H_4SO_2$)naphthalene | Reddish blue |
| 15 | " | " | 2-amino-4-sulfo-phenyl-$SO_2C_2H_4OSO_3H$ | Reddish blue |
| 16 | 2-amino-4-chloro-5-aminobenzenesulfonic acid | dioxazine with Cl/SO₃H/NH₂ substituents | 4-amino-phenyl-$SO_2C_2H_4OCOCH_3$ | Reddish blue |
| 17 | " | " | 3-amino-phenyl-$SO_2C_2H_4OSO_3H$ | Reddish blue |
| 18 | 2-amino-4-chloro-5-aminobenzenesulfonic acid | dioxazine with Cl/SO₃H/NH₂ substituents | 2-amino-1-sulfo-naphthyl-$SO_2C_2H_4OSO_3H$ | Reddish blue |

| Example No. | Aniline compound (V) | Intermediate dioxazine (II) | Amine (III) | Shade |
|---|---|---|---|---|
| 19 | 2,5-disulfo-aniline structure | symmetric dichloro-dioxazine with two 4-amino-2,6-disulfophenoxy groups | 4-H₂N-C₆H₄-SO₂C₂H₄OPO₃H₂ | Reddish blue |
| 20 | " | " | 6-amino-2-(HO₃SOC₂H₄SO₂)-naphthalene | Reddish blue |
| 21 | 4-methoxy-2-sulfo-aniline linked via NH to second ring | dichloro-dioxazine with two (4-amino-3-sulfophenyl)amino-2-methoxy-5-sulfo groups | 3-H₂N-C₆H₄-SO₂C₂H₄OSO₃H | Reddish blue |
| 22 | 5-methoxy-2-(β-aminoethylamino)-4-sulfo-aniline | dichloro-dioxazine with two (β-aminoethylamino)-2-methoxy-5-sulfo groups | 2-amino-1-SO₃H-5-SO₂C₂H₄OSO₃H-naphthalene | Blue |
| 23 | " | " | 2-amino-4-(SO₂C₂H₄OSO₃H)-1-SO₃H-benzene | " |

| Example No. | Aniline compound (V) | Intermediate dioxazine (II) | Amine (III) | Shade |
|---|---|---|---|---|
| 24 | (structure: aniline with OCH3, NH2, NHC3H6NH2, SO3H) | (dioxazine intermediate structure) | (structure: N-ethyl aniline with SO2C2H4OSO3H) | " |
| 25 | " | " | (structure: N-ethyl aniline with SO2C2H4OSO3H) | " |
| 26 | (structure: diphenylamine with OCH3, NH2, SO3H groups) | (dioxazine intermediate structure) | (structure: 2-aminonaphthalene with HO3SOC2H4SO2) | Reddish blue |

EXAMPLE 27

The triphenodioxazine compound obtained in Example 12 (0.3 part) was dissolved in water (200 parts), and cotton (10 parts) was added thereto. The bath was heated to 50° C., and 30 minutes thereafter, sodium carbonate (4 parts) was added thereto. Dyeing was continued at that temperature for 1 hour. Thereafter, the cotton taken out was washed with water and soaped to obtain a dyed product of a reddish blue color superior in fastness properties, particularly such as chlorine fastness, light fastness and perspiration-light fastness, with superior build-up property.

EXAMPLE 28

The triphenodioxazine compounds obtained in Examples 3 to 11 and 13 to 26 (each 0.1, 0.3 and 0.6 part) each was dissolved in water (200 parts), and sodium sulfate (10 parts) and cotton (10 parts) were added thereto. The bath was heated to 60° C., and then sodium carbonate (4 parts) was added thereto. Respective dyeings were continued at that temperature for 1 hour. The cotton taken out was washed with water and soaped, followed by washing with water and drying to obtain each dyed product of a blue color superior in fastness properties, particularly such as chlorine fastness, light fastness and perspiration-light fastness, with superior build-up property.

EXAMPLE 29

The intermediate dioxazine compound (120 parts) obtained in the same manner as in Example 1 and metanilic acid (12.7 parts) were added to water (500 parts) in this order, and the mixture was heated upto 70° to 80° C., while hydrochloric acid generated being neutralized using sodium carbonate, and allowed to react with each other at that temperature. Thereafter, salting-out of the reaction mixture gave a triphenodioxazine compound of the following formula in the free acid form.

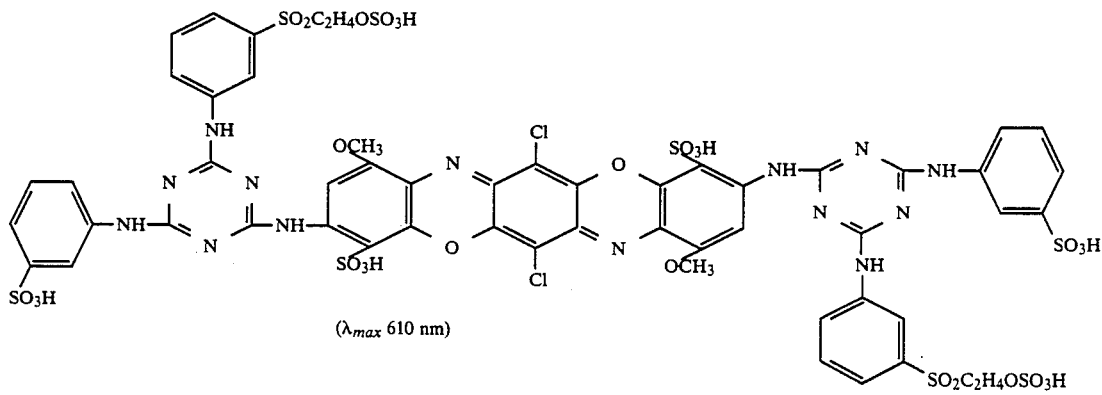

($\lambda_{max}$ 610 nm)

EXAMPLE 30

The triphenodioxazine compound obtained in Example 29 (0.3 part) was dissolved in water (200 parts), and cotton (10 parts) was added thereto. The bath was heated to 50° C. 30 Minutes thereafter, sodium carbonate (4 parts) was added thereto, and dyeing was continued at that temperature for 1 hour. Thereafter, the cotton taken out was washed with water and soaped to obtain a dyed product of a reddish blue superior in fastness properties, particularly such as chlorine fastness, light fastness and perspiration-light fastness, with superior build-up property.

EXAMPLE NOS. 31 TO 48

Using the intermediate dioxazine compound of the formula (II) as shown in the following table, which had been obtained in manner similar to that of Example 1, excepting use of the aniline compound (V) also as shown below in place of 1,4-diamino-2-methoxybenzene-5-sulfonic acid, Example 29 was repeated, provided that metanilic acid was replaced by the compound (IV) also as shown below, whereby the corresponding triphenodioxazine compound was obtained.

| Example No. | Aniline compound (V) | Intermediate dioxazine (II) | Compound (IV) | Amine (III) | Shade |
|---|---|---|---|---|---|
| 31 | OCH₃, NH₂, SO₃H, H₂N-benzene | dioxazine with SO₃H, OCH₃, NH₂, Cl, Cl groups | morpholine (O, H-N ring) | 3-aminobenzene with SO₂C₂H₄OSO₃H | Reddish blue |
| 32 | " | " | " | " | " |
| 33 | " | " | HO-C₆H₄-SO₃H and HN(C₂H₄OH)₂ | 4-amino-3-ethylbenzene with SO₂C₂H₄OSO₃H | " |
| 34 | OCH₃, NH₂, SO₃H, H₂N-benzene | dioxazine with SO₃H, OCH₃, NH₂, Cl, Cl groups | 2-amino-1,4-benzenedisulfonic acid (SO₃H, H₂N, SO₃H) | 4-amino-2,5-dimethoxybenzene with SO₂C₂H₄OSO₃H | Reddish blue |

-continued

| Example No. | Aniline compound (V) | Intermediate dioxazine (II) | Compound (IV) | Amine (III) | Shade |
|---|---|---|---|---|---|
| 35 | " | " | $H_2NC_2H_4SO_3H$ | 2-amino-6-($SO_2C_2H_4OSO_3H$)-naphthalene-1-sulfonic acid | " |
| 36 | 2,4-diamino-toluene-5-sulfonic acid | dioxazine with $CH_3$, $SO_3H$, $NH_2$ substituents | $HN(C_2H_5)_2$ | N-ethyl-4-($SO_2C_2H_4OSO_3H$)-aniline | " |
| 37 | " | " | 3-amino-naphthalene-1,5-disulfonic acid | 4-amino-2,5-dimethoxy-phenyl-$SO_2C_2H_4OSO_3H$ | " |
| 38 | 2,4-diamino-phenetole-5-sulfonic acid | dioxazine with $OC_2H_5$, $SO_3H$, $NH_2$ substituents | $HN(C_2H_5)(CH_2OH)$ | 4-amino-3-sulfo-phenyl-$SO_2C_2H_4OSO_3H$ | Reddish blue |

-continued

| Example No. | Aniline compound (V) | Intermediate dioxazine (II) | Compound (IV) | Amine (III) | Shade |
|---|---|---|---|---|---|
| 39 | 4-Cl, 2-NH₂, 5-SO₃H aniline (H₂N, Cl, SO₃H, H₂N) | dichloro-dioxazine with SO₃H, Cl, NH₂ substituents | morpholine | N-ethyl-3-(β-sulfatoethylsulfonyl)aniline (C₂H₅-HN-C₆H₄-SO₂C₂H₄OSO₃H) | " |
| 40 | 2,5-diaminobenzenesulfonic acid (H₂N, SO₃H, H₂N) | " | HN(CH₂OH)₂ | 6-amino-2-(β-sulfatoethylsulfonyl)naphthalene (H₂N-naphthyl-SO₂C₂H₄OSO₃H) | " |
| 41 | 2,5-diaminobenzenesulfonic acid | dichloro-dioxazine with SO₃H, NH₂, SO₃H substituents | piperazine (HN⟨⟩NH) | " | " |
| 42 | 2,5-diamino-1,4-benzenedisulfonic acid (SO₃H, H₂N, SO₃H, NH₂) | " | H₂NCH₂COOH | 4-amino-phenyl vinyl sulfone (H₂N-C₆H₄-SO₂CH=CH₂) | Reddish blue |

| Example No. | Aniline compound (V) | Intermediate dioxazine (II) | Compound (IV) | Amine (III) | Shade |
|---|---|---|---|---|---|
| 43 | (structure) | (structure) | $NH_3$ | (structure with $SO_2C_2H_4O\,SO_3H$) | " |
| 44 | (structure) | (structure) | (structure) | (structure with $OCH_3$, $SO_2C_2H_4OSO_3H$) | " |
| 45 | (structure) | (structure) | (structure) | (structure with $C_2H_5$, $SO_2C_2H_4OSO_3H$) | Blue |

| Example No. | Aniline compound (V) | Intermediate dioxazine (II) | Compound (IV) | Amine (III) | Shade |
|---|---|---|---|---|---|
| 46 | 3-OCH₃, 4-NH₂, 5-SO₃H aniline with NHC₂H₄NH₂ | dioxazine with NHC₂H₄NH₂, SO₃H, OCH₃ substituents | H₂NC₂H₄SO₃H | 2-amino-1-SO₃H-5-(SO₂C₂H₄OSO₃H) naphthalene | Blue |
| 47 | 3-OCH₃, 4-NH₂-aniline-SO₃H with NHC₃H₆NH₂ | dioxazine with NHC₃H₆NH₂ substituents | H₂NC₂H₄OCH₃ | 2-Cl-4-(SO₂C₂H₄OSO₃H)aniline | " |
| 48 | " | " | 4-aminobenzenesulfonic acid | 2-SO₃H-4-(SO₂C₂H₄OSO₃H)aniline | " |

EXAMPLE 49

The triphenodioxazine compound obtained in Example 37 (0.3 part) was dissolved in water (200 parts), and cotton (10 parts) was added thereto. The bath was heated to 50° C. 30 Minutes thereafter, sodium carbonate (4 parts) was added thereto, and dyeing was continued at that temperature for 1 hour. Thereafter, the cotton taken out was washed with water and soaped to obtain a dyed product of a reddish blue color superior in fastness properties, particularly such as chlorine fastness, light fastness and perspiration-light fastness, with superior build-up property.

EXAMPLE 50

The triphenodioxazine compounds obtained in Examples 31 to 36 and 38 to 48 (each 0.1, 0.3 and 0.6 part) each was dissolved in water (200 parts), and sodium sulfate (10 parts) and cotton (10 parts) were added thereto. The bath was heated to 60° C., and then sodium carbonate (4 parts) was added thereto. Respective dyeings were continued at that temperature for 1 hour. Thereafter, the cotton taken out was washed with water and soaped, followed by washing with water and drying, to obtain each dyed product of a blue color superior in fastness properties, particularly such as chlorine fastness, light fastness and perspiration-light fastness, with superior build-up property.

EXAMPLE 51

In water (200 parts) were added 2-hydroxy-4,6-dichloro-s-triazine (17.1 parts) and the same intermediate compound as in Example 1 (60.5 parts), and allowed to react likewise with each other. Successively, 1-amino-benzene-3-β-sulfatoethylsulfone (28 parts) was added thereto to perform the reaction. Thereafter, salting-out gave a triphenodioxazine compound of the following formula in the free acid form.

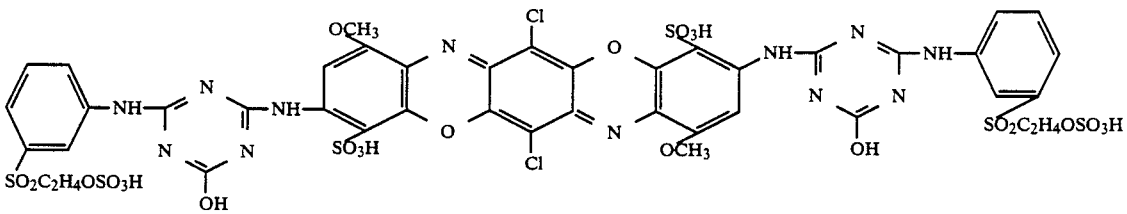

EXAMPLE 52

Like in Example 51, using 2-methoxy-4,6-dichloro-s-triazine (18.5 parts), the same intermediate dioxazine compound (60.5 parts) and 1-aminobenzene-3-β-sulfatoethylsulfone (28 parts), there was obtained a triphenodioxazine compound of the following formula in the free acid form.

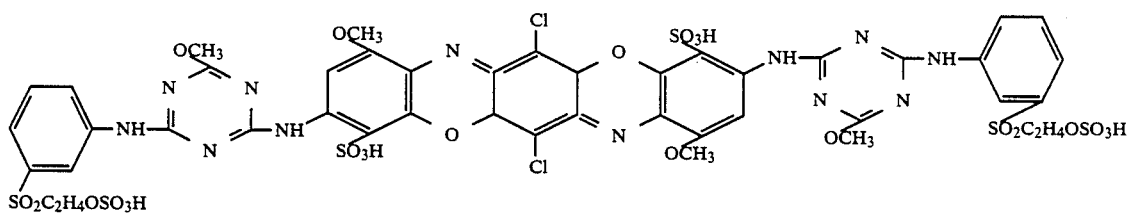

EXAMPLE 53

A condensate between the intermediate dioxazine compound (60.5 parts) and cyanuric chloride (19 parts) was prepared and mixed with sodium sulfite to replace one chloro of the condensate by sulfo. Successively, 1-aminobenzene-3-β-sulfatoethylsulfone (28 parts) was added to replace another chloro of the condensate. Salting-out of the resulting reaction mixture gave a triphenodioxazine compound of the following formula in the free acid form.

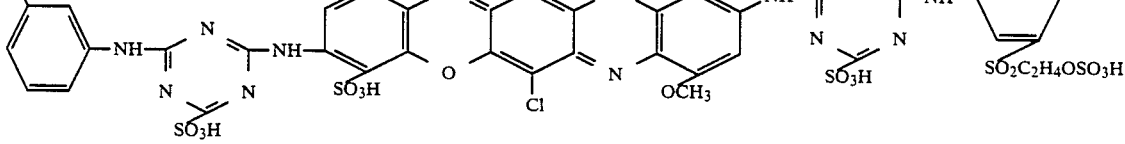

EXAMPLES 54 TO 65

With use of the intermediate dioxazine compound (II) and the amine compound (III), both being as shown in the following table, following any one of Examples 51 to 53 resulted in the corresponding triphenodioxazine compound.

| Example No. | Intermediate dioxazine (II) | Q | Amine (III) | Shade |
|---|---|---|---|---|
| 54 | (structure with OCH₃, SO₃H, NH₂, Cl, O, N) | —OCH₃ | 2-amino-naphthalene with SO₃H and SO₂C₂H₄OSO₃H | Reddish blue |
| 55 | (structure with SO₃H, NH₂, SO₃H, Cl, O, N) | " | 4-amino-2-(SO₂CH=CH₂)-anisole (OCH₃) | " |
| 56 | " | —OH | 6-amino-2-(SO₂C₂H₄OSO₃H)-naphthalene | " |
| 57 | (structure with SO₃H, NH₂, OC₂H₅, Cl, O, N) | —OC₂H₅ | aniline with SO₃H, NH₂, SO₂C₂H₄OSO₃H | Reddish blue |
| 58 | (structure with SO₃H, NH₂, Cl, Cl, O, N) | —SO₃H | N-ethyl aniline with SO₂C₂H₄OSO₃H | " |
| 59 | (structure with SO₃H, NH₂, CH₃, Cl, O, N) | " | N-ethyl-3-(SO₂C₂H₄OSO₃H)-aniline | " |

-continued

| Example No. | Intermediate dioxazine (II) | Q | Amine (III) | Shade |
|---|---|---|---|---|
| 60 | (structure) | —OCH₃ | (structure) | " |
| 61 | (structure) | —OH | (structure) | Blue |
| 62 | (structure) | —SO₃H | (structure) | " |
| 63 | (structure) | —OCH₃ | (structure) | " |
| 64 | " | " | (structure) | " |
| 65 | (structure) | —OCH₃ | (structure) | Blue |

EXAMPLE 66

The triphenodioxazine compound obtained in Example 53 (0.3 part) was dissolved in water (200 parts), and cotton (10 parts) was added thereto. The bath was heated to 50° C., and 30 minutes thereafter, sodium carbonate (4 parts) was added thereto. Dyeing was continued at that temperature for 1 hour. The cotton taken out was washed with water and soaped to obtain a dyed product of a reddish blue color superior in fastness properties, particularly such as chlorine fastness, light fastness and perspiration-light fastness with superior build-up property.

EXAMPLE 67

The triphenodioxazine compounds obtained in Examples 51 and 52 to 65 (each 0.1, 0.3 and 0.6 part) each was dissolved in water (200 parts), and sodium sulfate (10 parts) and cotton (10 parts) were added thereto. The bath was heated to 60° C., and then sodium carbonate (4 parts) was added thereto. Respective dyeings were continued at that temperature for 1 hour. The cotton taken out was washed with water and soaped, followed by washing with water and drying to obtain each dyed product of a blue color excellent in fastness properties, particularly such as chlorine fastness, light fastness and perspiration-light fastness, with superior build-up property.

EXAMPLE 68

| Composition of color paste | |
|---|---|
| Triphenodioxazine compound obtained in Example 1 | 5 parts |
| Urea | 5 parts |
| Sodium alginate (5%), thickener | 50 parts |
| Hot water | 25 parts |
| Sodium hydrogencarbonate | 2 parts |
| Water (balance) | 13 parts |

Mercerized cotton broad cloth was printed with the color paste having the above composition, pre-dried, steamed at 100° C. for 5 minutes, washed with hot water, soaped, again washed with water and dried, thereby obtaining a printed product of a blue color excellent in fastness properties.

What is claimed is:

1. A dioxazine compound represented by the following formula in the free acid form:

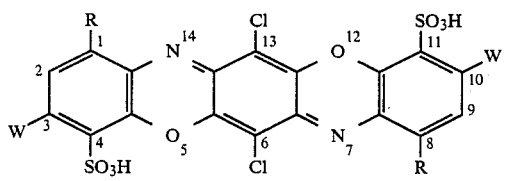

(I)

wherein R is halogeno, alkyl, alkoxy or sulfo, and W is

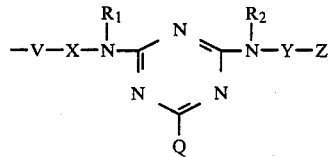

wherein V is a direct linkage or

in which $R_3$ is hydrogen or unsubstituted or substituted alkyl, X is a direct linkage or a straight or branched aliphatic, alicyclic, araliphatic or aromatic bridging group unsubstituted or substituted by sulfo, carboxy, methoxy or phenyl, Y is phenylene unsubstituted or substituted once or twice by methyl, ethyl, methoxy, ethoxy, chloro, bromo, nitro, or sulfo, or naphthylene unsubstituted or substituted once by sulfo, Z is $-SO_2CH=CH_2$ or $-SO_2CH_2CH_2Z_1$ in which $Z_1$ is a group splittable by the action of an alkali, Q is sulfo, hydroxy, halogeno, alkoxy, phenoxy unsubstituted or substituted once or twice by chloro, bromo, methyl, ethyl, methoxy, ethoxy, sulfo or carboxy, amino, alkylamino, cycloalkylamino, aralkylamino, arylamino, N,N-dialkylamino, N-alkyl-N-cycloalkylamino, N-alkyl-N-arylamino, heterocyclic ring-containing amino or N-heterocyclic ring-constituting amino, and $R_1$ and $R_2$ independently of one another are each hydrogen or alkyl.

2. A dioxazine compound according to claim 1, wherein R is chloro, methyl, methoxy, ethoxy or sulfo.

3. A dioxazine compound according to claim 1, wherein V is —NH— or a direct linkage.

4. A dioxazine compound according to claim 1, wherein X is a direct linkage, ethylene, propylene or phenylene unsubstituted or substituted once or twice by sulfo.

5. A dioxazine compound according to claim 1, wherein $R_1$ and $R_2$ independently of one another are each hydrogen or methyl.

6. A dioxazine compound according to claim 1, wherein Z is $-SO_2CH=CH_2$ or $-SO_2CH_2CH_2OSO_3H$.

7. A dioxazine compound according to claim 1, wherein Q is chloro.

8. A dioxazine compound according to claim 1, wherein R is chloro, methyl, methoxy, ethoxy or sulfo, and W is

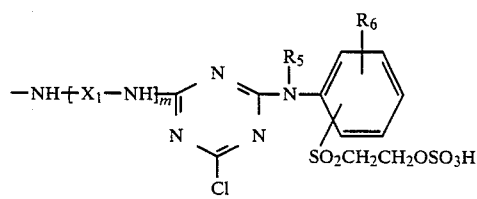

wherein $X_1$ is ethylene, propylene or sulfophenylene, $R_5$ is hydrogen, methyl or ethyl, $R_6$ is hydrogen, methyl, methoxy or sulfo, and m is 0 or 1.

* * * * *